United States Patent [19]

Kallies et al.

[11] Patent Number: 4,944,473
[45] Date of Patent: Jul. 31, 1990

[54] LOCKING MECHANISM FOR AN AIRCRAFT DOOR

[75] Inventors: Guenter Kallies; Wolfgang Lessat-Kaupat, both of Hamburg, Fed. Rep. of Germany

[73] Assignee: Messerschmitt-Boelkow-Blohm GmbH, Munich, Fed. Rep. of Germany

[21] Appl. No.: 317,945

[22] Filed: Mar. 2, 1989

[30] Foreign Application Priority Data

Mar. 4, 1988 [DE] Fed. Rep. of Germany ....... 3807067

[51] Int. Cl.⁵ .............................................. B64C 1/14
[52] U.S. Cl. ................................................. 244/129.5
[58] Field of Search .................... 244/129.5; 292/210, 292/217, 196, 223

[56] References Cited

U.S. PATENT DOCUMENTS 4,560,123 12/1985 Sealey et al. ..................... 244/129.5
4,758,030 7/1988 Kupfernagel ..................... 244/129.5

FOREIGN PATENT DOCUMENTS 231483 6/1959 Australia .......................... 244/129.5

Primary Examiner—Charles T. Jordan
Assistant Examiner—Rochelle Lieberman
Attorney, Agent, or Firm—W. G. Fasse; D. H. Kane, Jr.

[57] ABSTRACT

The locking mechanism of an aircraft door is linked with a testing device in such a manner that the inoperability of the testing device indicates a failure in the proper locking or latching of the door in its closed position. The testing device may, for example, be a lever which is actuated last in a sequence of door closing and locking or latching steps. Such a lever could, for instance, be the lever for bringing an emergency chute into a ready or stand-by condition. The linkage assures that the testing lever for operating the emergency chute can be activated only if the door is properly closed and latched. As a result, a door that is incompletely closed and/or incompletely latched will provide an immediate indication of that situation.

5 Claims, 4 Drawing Sheets

LOCKING MECHANISM FOR AN AIRCRAFT DOOR

FIELD OF THE INVENTION

The invention relates to a locking mechanism for an aircraft door which is tilted out of the aircraft body contour for opening the door and which is tilted inwardly to close the door into a form-locking positive fit within the aircraft body contour.

BACKGROUND INFORMATION

Aircraft doors have locking mechanisms including a toggle lever arrangement for achieving a positive locking in the closed position. It is also known to provide aircraft doors with a compartment containing an emergency exit chute. A control lever is provided for making the chute ready for use when the door has been closed to bring the chute into a stand-by condition or state. It is also standard practice that two different levers must be operated for closing the door in accordance with safety regulations in order to avoid accidents caused by improperly closed doors or by a door that has not been properly latched in its closed position. Most recent safety regulations suggest and require that doors for pressurized aircraft cabins are equipped with means for testing the complete and safe latching of any aircraft door.

One such means for testing could, for example, comprise a venting device arranged in such a manner that it prevents the pressurization of the aircraft cabin when the door is not properly or completely latched. Thus, an indication of an insufficiently or improperly locked door would be provided by the fact that the aircraft cabin cannot be pressurized. However, such a solution to the problem of providing an indication of an improperly locked aircraft door is involved and hence expensive since it requires means for sensing cabin pressure in response to a properly closed door. The additional equipment needed for this purpose would add to the aircraft weight and to its costs. Another disadvantage of such a solution is seen in that a certain length of time would have to pass after starting the cabin pressurization before an improperly closed or improperly locked door could be discovered. Thus, steps to properly close the door could only be taken after such discovery and these delays are undesirable.

OBJECTS OF THE INVENTION

In view of the foregoing it is the aim of the invention to achieve the following objects singly or in combination:

to provide a door locking mechanism for an aircraft door which meets modern safety regulations, which is simple in its structure, yet satisfactory with regard to its weight and costs;

to provide an immediate indication that an aircraft door is incompletely latched after it has been closed; and to provide a latching mechanism for an aircraft door that requires two operational steps for a complete closing and latching, whereby the second step is prevented unless the first step has resulted in a proper closing and latching.

SUMMARY OF THE INVENTION

According to the invention there is provided a door locking or latching mechanism in which means for testing the proper latched condition of the aircraft door are linked to the latching mechanism in such a manner that the testing means cannot be operated unless the door has been properly closed and latched. According to an advantageous embodiment of the invention, the lever normally used for bringing an emergency chute into a stand-by condition is simultaneously used as a testing lever for testing the properly closed and latched condition of the door. Generally, any lever provided for performing the last operational step in a door closing and locking operation can be linked to the locking mechanism for the present testing purpose.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
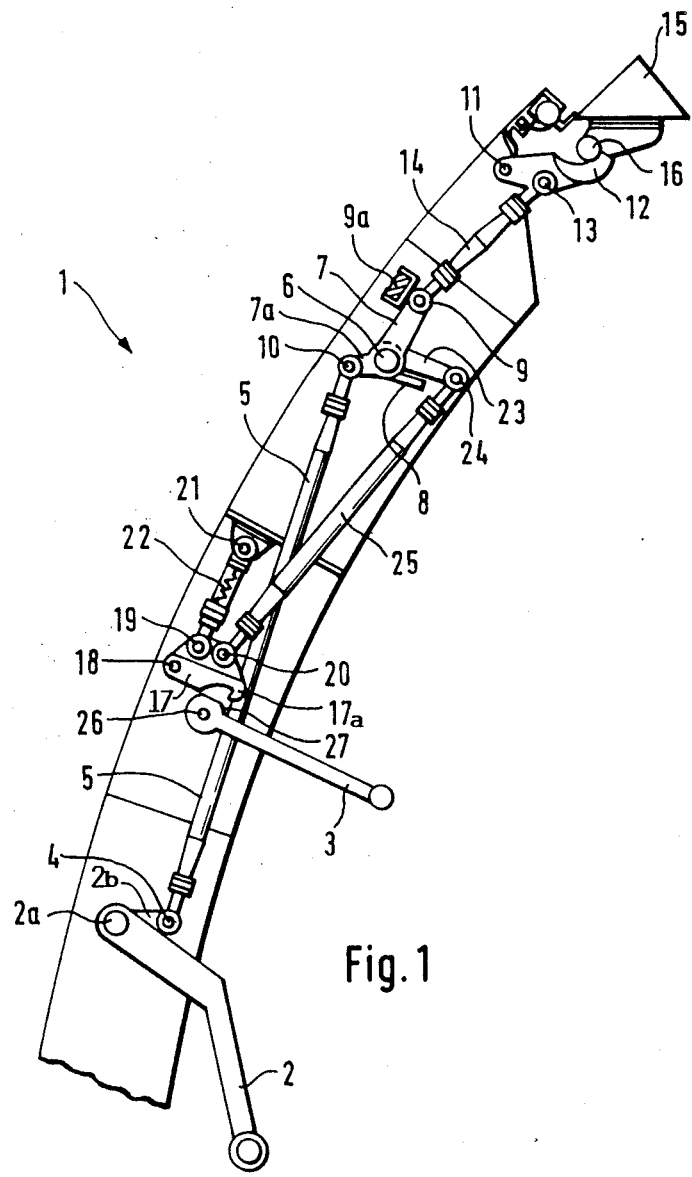
FIG. 1 is a side view of an aircraft door equipped with a locking or latching mechanism according to the invention showing the door in its closed condition.

FIG. 1 shows a side view of an aircraft door locking mechanism installed inside the door 1 and comprising an operating lever 2 operable inside an aircraft cabin, and a testing lever 3 also operable inside the cabin. The testing lever 3 may, for example, simultaneously perform the function of readying an emergency chute conventionally installed inside the door frame, but not shown since not essential for a full disclosure of the invention. The operating lever 2 for latching or locking the door in a closed position is pivoted to the door structure by a journal shaft 2a about which the operating lever 2 can be tilted up or down. An extension arm 2b rigidly connected to the operating lever 2 is pivoted with its free end 4 to the lower end of a connecting rod 5, the upper end 10 of which is pivoted to a lever arm 7a of a lever 7 which in turn is rigidly connected to a latching shaft 6 mounted in the door structure. The upwardly reaching arm of the lever 7 is pivoted to a pivot point 9 forming part of a toggle arrangement. The lever arms 7 and 7a are rigidly mounted on the latching shaft 6 so that the shaft 6 rotates with the rotation of the levers 7 and 7a. These levers 7 and 7a enclose an angle as shown in FIG. 1.

The arrangement comprising the levers 7 and the rod 14 which is pivoted at 9 to the lever 7 and at 13 to the locking mechanism comprising the hook 12 is provided in duplicate as will be described in more detail below. The second half of the arrangement is not visible in FIG. 1, due to the two-dimensional illustration.

The locking mechanism proper comprising a latching hook 12 is hinged or pivoted to the door structure at 11. Additionally, the hook 12 is pivoted to the connecting rod 14 which in turn is pivoted with its lower end to the lever 7 at 9. The aircraft body is not shown, but has rigidly secured thereto a locking or latching catch 15 with a latching eye 16. In the closed position shown in FIG. 1, the hook 12 engages the eye member 16.

A blocking member 17 having a hook 17a is hinged or pivoted, e. g. at 18 to the door structure, and comprises two further pivots 19 and 20. A biasing member, for example, in the form of an elongated compression spring 22 is pivotally connected with its lower end to the pivot point 19. The upper end of the biasing spring 22 is pivoted to the door at 21. The arrangement is such that the spring tends to turn the blocking member 17 with its hook 17a in a clockwise direction around the pivot 18. A lever 23 is tiltably mounted on the locking or latching shaft 6. The free end of the lever 23 is pivoted at 24 to a connecting rod 25 the lower end of which is pivoted at 20 to the blocking member 17. The testing lever 3 which is pivoted, for example to the door at 26, is provided with a catch surface 27 arranged for cooperation with the hook 17a as will be described in more detail below.

Figure 4:
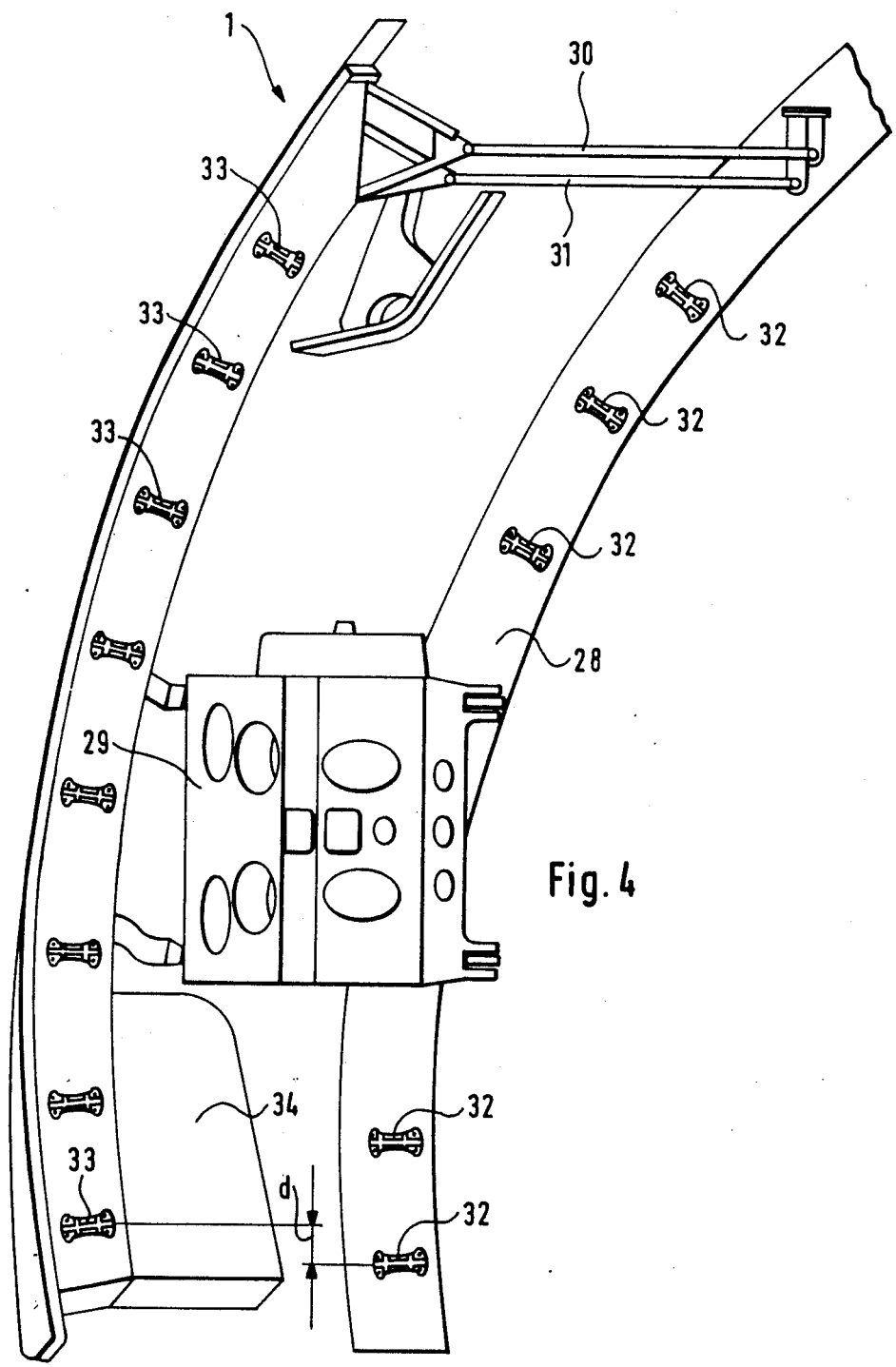
FIG. 4 is a view showing the door in its open condition and looking in the direction of the arrow IV in FIG. 3.

In its fully open state the door 1 is located outside the contour of the aircraft body as best seen in FIG. 4. For closing the door 1 it is tilted from the outside into the contour of the body structure, whereby the latching hook 12 passes below the latching eye 16 prior to reaching the latching position shown in FIG. 1. Once the tilting movement is completed, the door 1 is slightly lowered into a form-locking or positively locking position by tilting the operating lever 2 downwardly, that is, in the clockwise direction about its pivot or journal point 2a. The downward movement of the operating lever 2 also moves its arm 2b clockwise, thereby pulling the connecting rod 5 downwardly which in turn tilts the lever 7, 7a counterclockwise together with the shaft 6, whereby the hook 12 is tilted upwardly until it engages the latching eye 16 as shown in FIG. 1. In this condition, the pivot 9 forms a toggle joint which has reached its end position against a stop 9a in the door structure. On its way into the locked position in response to the downward movement of the operating lever 2, the toggle joint 9 moves, as mentioned, counterclockwise through a line passing through the centers of the latching shaft 6 and through the pivot 13. The spacing between the just mentioned line and the stop 9a is so dimensioned that a positive locking is achieved as a result of the toggle action. Thus, when the lever 2 has reached its lowermost position a proper locking of the door is assured automatically, that is, without performing any special operating steps other than tilting the lever downwardly.

As the lever 7 tilts counterclockwise during the locking motion an entraining lever 8 also moves counterclockwise due to its rigid connection to the latching shaft 6. The entraining lever 8 thus travels in synchronism with the toggle joint 9 and engages the lever 23. For this purpose the entraining lever 8 is so constructed that it will contact the lever 23 when the entraining lever 8 moves counterclockwise. As a result, the lever 23 will also move counterclockwise, thereby lifting the connecting rod 25 which in turn tilts the blocking member 17 counterclockwise about its pivot or journal 18 and against the biasing force of the spring 22.

For this purpose the blocking member 17 is so constructed with its hook 17a that it will not engage the blocking surface 27 of the testing lever 3 when the door is properly latched, that is, when the toggle arrangement 7, 14 with its toggle joint 9 rests properly against the stop 9a and the hook 12 has properly engaged the latching eye 16 as shown in FIG. 1. If this condition exists, the testing lever 3 can be freely operated, for example, for making an emergency chute ready. For this purpose the lever 3 needs to be tilted clockwise or downwardly and since the hook 17a does not engage the blocking surface 27, the lever 23 can be moved without problems, thereby signifying the proper latching of the door. On the other hand, when the door is not properly locked, for example, because the toggle joint 9 has not reached its stop position against the stop 9a, the entraining lever 8 will not have engaged the lever 23 and hence the latter cannot lift the connecting rod 25 and accordingly also not the hook 17a. As a result, the hook 17a keeps engaging the blocking surface 27 of the testing lever 3 under the force of the spring 22, thereby signifying that the door 1 has not been properly latched. This condition prevails until the locking has been completed by further manipulation of the lever 2 until the hook 17a disengages the blocking surface 27, thereby releasing the lever 3 and signifying the proper latching.

Figure 2:
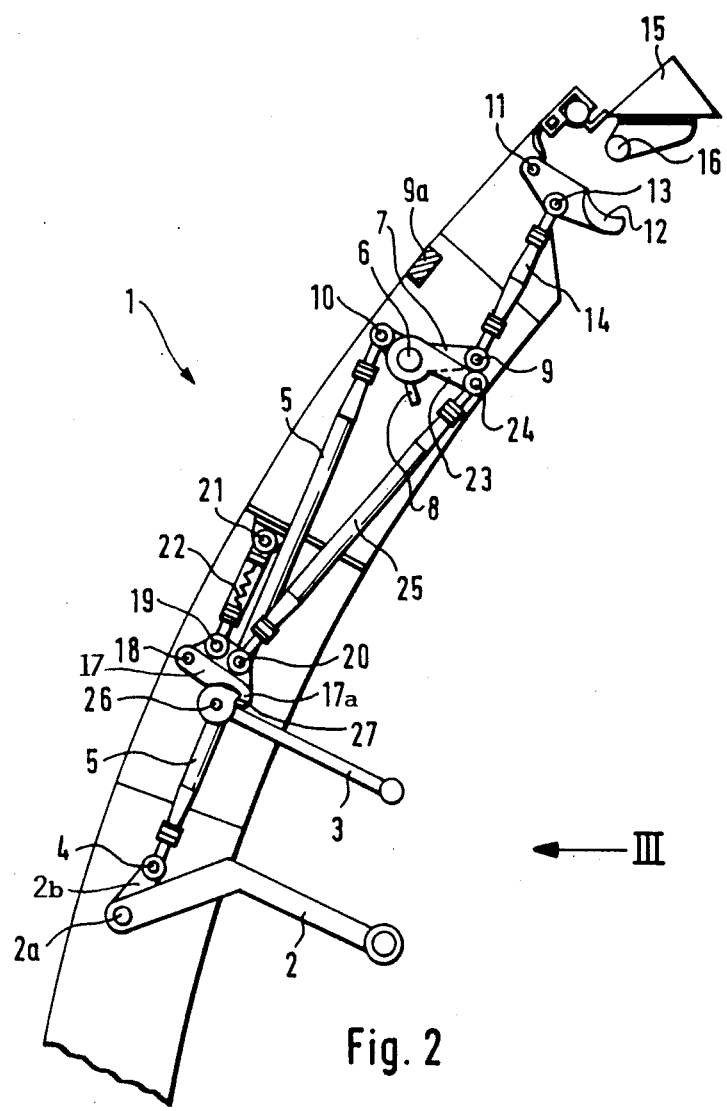
FIG. 2 is a view similar to that of FIG. 1, but showing the door in a partially opened condition.

FIG. 2 illustrates an opening operation of the door at the stage when the operating lever 2 and the testing lever 3 have both reached their uppermost, open position permitting the tilting of the door into its open position shown in FIG. 4. For reaching the position shown in FIG. 2, the operating lever 2 is first lifted, thereby it is rotated in the counterclockwise direction, whereby the lever 7 operated by the connecting rod 5 and the shaft 6 is rotated counterclockwise, thereby lifting the toggle joint 9 off its stop 9a and pulling the hook 12 downwardly through the rod 14 to disengage from the latching eye 16. Due to the clockwise movement of the lever 7 the entraining lever 8 also moves clockwise, thereby disengaging from the lever 23 to enable the compression spring 22 to move the blocking hook 17a into the position shown in FIG. 2 in which it blocks any further movement of the testing lever 3. As a result, the testing lever 3 can be brought into its ready for take-off position only after the door 1 has been again properly latched as described above for the next flight.

Figure 3:
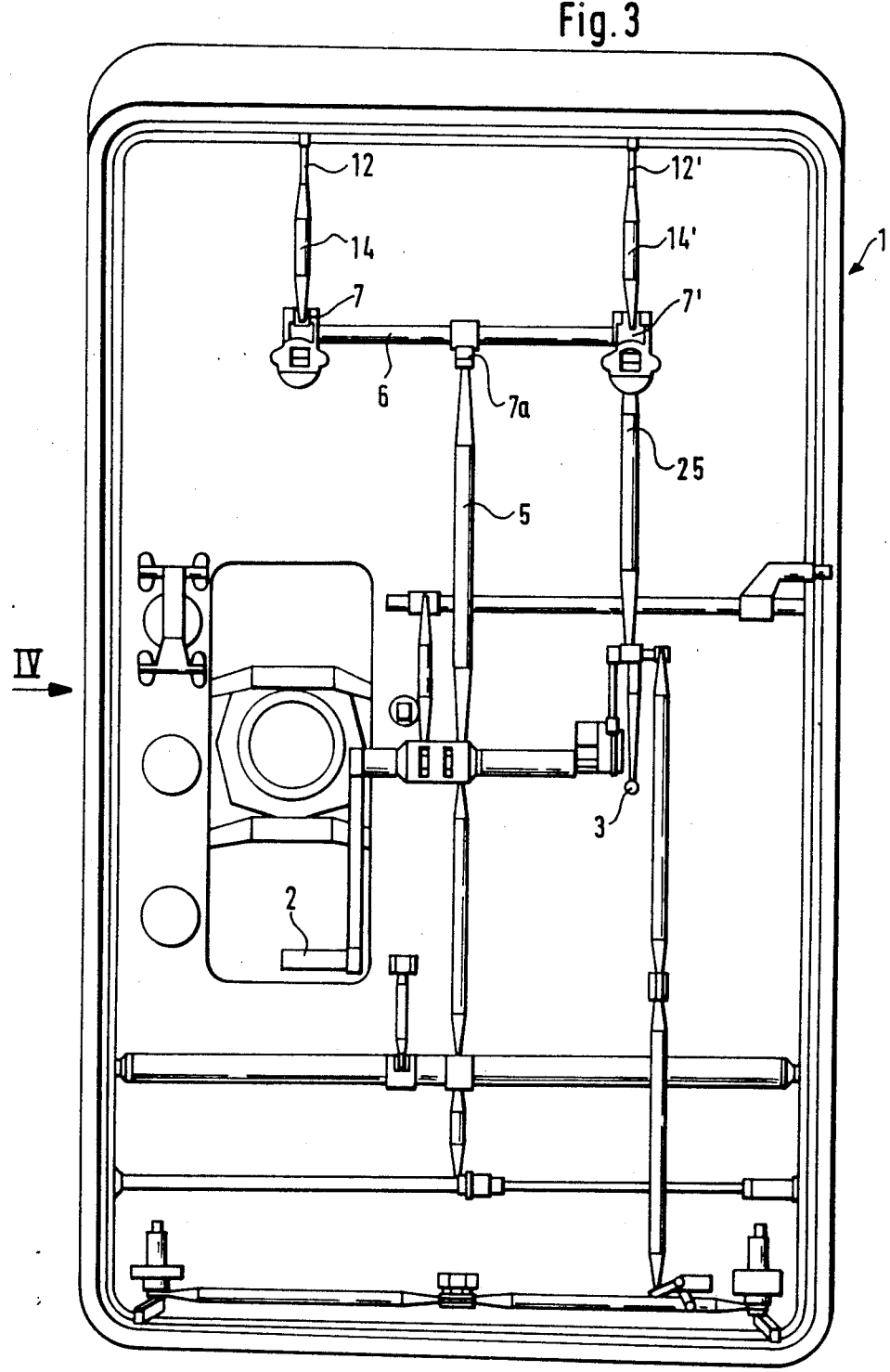
FIG. 3 is a view onto the door in the direction of the arrow III in FIG. 1.

FIG. 3 shows a plan view into the door structure in the direction of the arrow III in FIG. 1, whereby the interior door cover and the door carrying hinges have been omitted from the illustration to make the features of the invention better visible. These include the operating lever 2, the testing lever 3 simultaneously functioning as a lever for making an emergency chute ready, the connecting rod 5, the locking shaft 6, and the connecting rod 25. The locking shaft 6 is rigidly mounted at its end in the door structure and carries at its center the lever 7a. The lever 7 and its twin 7' are connected to the ends of the locking or latching shaft 6. Similarly, the connecting rod 14 and its twin 14' connect the lever 7 to the latching hook 12 and its twin 12' respectively.

FIG. 4 shows an open door 1 tilted outside of the aircraft body 28 and supported by a carrying hinge mechanism 29 of conventional construction. The hinge mechanism permits the door to be brought into a position to the side of the door opening. Two parallel guide bars 30 and 31 participate in properly guiding the door into the fully open position as is also conventional. The door opening, or rather the door frame around the opening carries door stop elements 32. The door itself carries similar door stop elements 33 around its edges. A container 34 holds a conventional emergency chute. The hinge 29 and the parallel guide rods 30 and 31 are conventionally so constructed that in the open position the door is lifted by the distance d relative to its closed condition. For properly closing the door 1 it is first tilted into the door opening and then lowered by the distance d, whereby the elements 32 and 33 engage each other for a positive form-locking of the door in its frame. When the door is properly closed with the elements 32, 33 interlocked, these elements are aligned with each other in the radial direction relative to the longitudinal axis of the aircraft body. These elements 32 and 33 interlock in such a way that any forces that are due to the pressure difference across the cabin door, are properly introduced into the aircraft body 28. In this context it is assumed that the pressure inside the cabin is larger than the pressure outside the cabin.

The above mentioned container 34 for an emergency chute is normally interlocked with the lower area of the door 1. The position of the container 34 as shown in FIG. 4 will prevail as long as the lever 3 has not been operated. If it becomes necessary to rapidly evacuate passengers from the aircraft, the lever 3 is operated prior to opening the door 1, whereby the chute is released from the door proper and anchored to the aircraft body so that an upper end of the chute remains connected to the door sill for the evacuation of passengers as soon as the door has been opened. The illustrated locking or latching mechanism according to the invention is not limited to a door of the type described above. While it is convenient to interlock the door operating latching lever 2 with the lever 3 for operating an emergency chute release, the invention is not limited to this particular embodiment since the lever 3 can be a mere testing lever. Further, the locking elements 32 and 33 are not necessary for the invention. Thus, the invention is also suitable for doors which interlock along their edges with the door frame by different conventional means. Instead of the blocking hook 17a other suitable blocking elements can be combined with the present system, for example, the blocking hook 17a could be replaced by a pin that is axially or radially displaceable relative to the pivot axis 26. Such a pin would engage a respective bore in the lever 3. Further, the invention is not limited to a compression spring 22. The effect of a tension spring or of a leaf spring could also be employed for the present purposes.

Although the invention has been described with reference to specific example embodiments, it is to appreciated that it is intended to cover all modifications and equivalents within the scope of the appended claims.

What we claim is:

1. A locking mechanism for an aircraft door, comprising means for latching said aircraft door in its closed condition, said latching means comprising an operating lever, latching eye means, latching hook means for engaging said latching eye means, linkage means including toggle action means operatively connecting said operating lever to said latching hook means for operating said latching hook means, testing means for ascertaining and indicating an improperly latched condition and a properly latched condition, said testing means comprising a testing lever (3) including arresting means for arresting said testing lever against further manipulation, and means for interlocking said latching means and said testing means, said interlocking means comprising a blocking member for cooperation with said arresting means of said testing means, and means for operating said blocking member in response to said improperly latched condition of said latching means to thereby render said testing lever inoperable for indicating said improperly latched condition, said testing lever remaining operable in response to said properly latched condition to indicate said properly latched condition.

2. The locking mechanism of claim 1, wherein said testing lever is arranged for bringing an emergency chute into a ready state when said door is properly latched.

3. The locking mechanism of claim 2, wherein said arresting means of said testing lever comprises a catch surface (27), wherein said blocking member comprises a blocking hook (17a) for engaging said catch surface for disabling said testing lever, wherein said interlocking means comprise a linking lever (23) and a connecting rod (25) linking said blocking hook (17a) to said latching means, said latching means including an entraining member (8) arranged for cooperation with said linking lever (23) for disengaging said blocking hook (17a) from said catch surface (27) when said aircraft door is properly latched and for engaging said blocking hook 17a with said catch surface when said aircraft door is not properly latched, whereby the testing lever is operable only if the aircraft door is properly latched.

4. The locking mechanism of claim 3, wherein said interlocking means comprise spring biasing means (22) arranged for normally urging said blocking member into a testing lever arresting position when said aircraft door is not properly latched.

5. The locking mechanism of claim 1, wherein said toggle action means comprise a toggle joint (9) and a stop (9a) so positioned in said aircraft door that said toggle joint bears against said stop when said latching hook means are in a proper door latching position.

* * * * *